United States Patent

[11] 3,629,025

| [72] | Inventor | Wilhelm E. Walles<br>Midland, Mich. |
|------|----------|---------------------------------|
| [21] | Appl. No. | 764,915 |
| [22] | Filed | Oct. 3, 1968 |
| [45] | Patented | Dec. 21, 1971 |
| [73] | Assignee | The Dow Chemical Company<br>Midland, Mich. |

[54] PROCESS FOR SEALING POLYOLEFIN CONTAINERS
5 Claims, No Drawings

[52] U.S. Cl.................................................. 156/69,
156/330, 260/79.3 R
[51] Int. Cl.................................................. B65b 7/00
[50] Field of Search............................................ 156/69,
330; 260/79.3

[56] References Cited
UNITED STATES PATENTS

| 2,697,162 | 12/1954 | Quandt.......................... | 156/69 |
| 2,837,497 | 6/1958 | Delmonte..................... | 156/330 X |
| 2,867,592 | 1/1959 | Morris et al. ................. | 156/330 X |
| 3,192,091 | 6/1965 | Hey et al....................... | 156/69 |
| 3,284,278 | 11/1966 | Falcone et al. ............... | 260/79.3 X |
| 3,501,553 | 3/1970 | Farber et al. ................. | 260/79.3 X |

*Primary Examiner*—Leland A. Sebastian
*Assistant Examiner*—S. R. Hellman
*Attorneys*—Griswold and Burdick, Richard G. Waterman, Lester J. Dankert and Benjamin G. Colley

ABSTRACT: Process for the sealing of polyolefin containers with an epoxy resin formulation in which the containers are sulfonated prior to the application of the epoxy resin.

PROCESS FOR SEALING POLYOLEFIN CONTAINERS

BACKGROUND OF THE INVENTION

It is known to make containers out of molded polyolefins which are well known for their chemical inertness to adhesives ("Handbook of Epoxy Resins" Lee and Neville page 21-6 (1967). It is sometimes desirable to make containers out of the molded polyolefins in which the contents are placed and then the cover is sealed on to protect the contents from moisture during storage, shipping and use. Examples of these uses are the sealing of deliquescent chemicals and sensitive items such as electronic gear for overseas shipment to the tropics, the sealing of dry cell batteries in a battery pack and the sealing of wet cell batteries such as a standard automotive 6 or 12 volt battery in a polyolefin case. This invention is particularly adapted to the sealing of wet cell batteries. It is also known to make battery cases out of hard rubber. These prior art battery cases suffer from the disadvantage of requiring the covers on tops to be sealed in pitch and the seal often cracked under operating conditions or with age. Recently, this situation was improved by the use of polyolefin battery cases as is illustrated by U.S. Pat. No. 3,388,077. Previously, these battery cases were heat sealed because the aforementioned chemical inertness of the polyolefin prevented sealing with adhesives. The heat sealing of the cover and case is difficult and requires skilled labor.

SUMMARY OF THE INVENTION

It has now been discovered that the prior art method of sealing polyolefin containers such as shipping containers, battery packs of dry cells, and especially polypropylene wet cell battery cases can be vastly improved by sulfonating the case and cover prior to their being sealed and then effecting a seal with epoxy resin. The preferred method according to this invention is to sulfonate the case and cover, apply epoxy resin to the locus of the seal, assemble the case and cover and cure the assembly for a time and at a temperature sufficient to develop the desired maximum strength of the epoxy resin.

GENERAL DESCRIPTION

The process of this invention is applied to molded polyolefin containers such as those made from a molding grade of polymers of ethylene, propylene, butene-1, methylpentene, interpolymers thereof and blends of these polymers. Examples of these are high density polyethylenes having a melt index of 1.8 grams per 10 minutes (ASTM D-1238 Condition E) and a density of 0.950 grams per cc. (ASTM D-1505) and those having a melt index of 1.0 grams per 10 minutes and a density of 0.978. Suitable polypropylenes are those having a melt flow (ASTM D-1238 Condition L) in the range of 0.5 to 15 with the range of 1-7 being preferred and a density of 0.900 to 0.920.

The molded containers and covers can be sulfonated by contacting the surfaces thereof with vapor phase or liquid phase sulfonation agents. If desired, only the mating surfaces of the container and the cover can be sulfonated by masking the portions which are not to be sulfonated. Generally, this is not worthwhile since the time and effort required to mask the container and cover exceeds the value of the chemicals used to sulfonate the entire container and cover. Examples of the liquid phase sulfonating agents are sulfur trioxide, oleum, chlorosulfonic acid, and sulfuryl chloride dissolved in a suitable inert solvent such as methylene chloride, carbon tetrachloride, perchloroethylene, tetrachloroethane, and ethylene dichloride. A dilute solution in the range of 1-10 percent of weight is normally adequate with a contact time of 30 seconds to 20 minutes at room temperature (25° C.) to give the desired degree of sulfonation, i.e., at least 0.005 milligram sulfonate groups per square centimeter of polyolefin surface or preferably in the range of 0.001 to 50 milligram sulfonate groups per square centimeter. It is to be understood that the time and concentration are inversely related so that if short contact times are desired, one must use a higher concentration. Oversulfonation is to be avoided since the sulfonation agents can blacken the polymer and severely corrode it. Generally, an amount of sulfonation greater than 50 milligrams per square centimeter does not contribute much to the ultimate adhesion and is therefore uneconomical.

Substantially the same results can be obtained using a dilute (1-5 percent) vapor phase sulfonation agent such as sulfur trioxide in an inert gas such as air, carbon dioxide, sulfur dioxide, or nitrogen.

Following the sulfonation step, the treated parts can be waterwashed, dried and used with the epoxy resin. It is preferred that the sulfonated parts be neutralized with dilute aqueous ammonia, ammonia gas or various amines such as methyl amine, isobutylamine, tetramethylene pentamine, monoethanolamine, triethanolamine, diethanolamine, ethylene diamine, etc. since this treatment enhances the adherence of the epoxy resins.

The epoxy resins used in this invention can be any of the known epoxy resins as set forth in the book "Handbook of Epoxy Resin" by Lee and Neville (1967), the preferred resins are liquid or flexible epoxy resins derived from the reaction of bisphenol A and epichlorohydrin. They range in epoxide equivalent weight from 170-250. The resins have a range of viscosities from 500-90,000 c.p.s. at 25° C. depending on the amount of reactive diluents that are added. Typical reactive diluents are butyl glycidyl ether and phenyl glycidyl ether.

In addition to the reactive diluents, it is sometimes desirable to add nonreactive modifiers or extenders such as dibutyl phthalate, pine oil, glycol ethers, and coal tar. Since coal tar has a high degree of chemical resistance, it is the preferred modifier for use in epoxy resins on battery applications.

The hardeners used with the above epoxy resins to produce the final cured resin are primary and secondary amines such as diethylene triamine, triethylene tetramine and tetraethylene pentamine. The amount of hardener to be used is usually an amount equal to the weight of the epoxy resin as is indicated in the above "Handbook of Epoxy Resins", Chapter 21.

The curing time for these epoxy resins and amine hardeners with modifying agent is on the order of several days at 25° C. However, the time can be shortened to a great extent by heating. Thus, the same resin/hardener formulation that takes 3 days to cure at 25° C. can be cured in 1-2 hours at 100° C.

The following examples are presented to illustrate the present invention and are not to be considered as a limitation on the scope of the claims.

EXAMPLE 1

A molded polypropylene automotive 12 volt battery case and cover with a peripheral groove are immersed in a 2 percent by weight solution of sulfur trioxide in methylene chloride for 2 minutes at 25° C. Both parts are removed and washed in a 5 percent by weight aqueous ammonia solution and dried.

The groove of the cover is then substantially filled with an epoxy formulation made from 98 parts of the diglycidyl ether of bisphenol-A having 186-192 epoxide equivalent weight and a viscosity of 11,000-14,000 c.p.s. at 25° C. diluted with 2 parts butyl glycidyl ether. The final epoxy formulation is made by blending this with an equal weight portion of a 50 percent mixture of triethylene tetramine and coal tar containing a small amount of phenol to extend the setting time.

The case and cover are then assembled, pressed together, and cured for 7 hours at room temperature.

The final sealed battery is found to be liquid tight and structurally strong.

EXAMPLE 2

In order to illustrate the superior strength of this method of sealing containers, the following example is presented.

A molded polypropylene battery cover having a peripheral groove is placed halfway into a 2 percent by weight solution of sulfur trioxide in methylene chloride for 1 minute at 25° C. so that a portion of the cover is sulfonated in accordance with this invention and a portion is left untreated for comparison. The cover is removed and washed in a solution of 5 percent by weight of aqueous ammonia and dried. Six test strips of polypropylene (⅛×1½×6 inches) are then sulfonated in a similar manner and bonded into the peripheral groove of the sulfonated half of the cover with the epoxy resin formulation of example 1.

Six of the untreated polypropylene strips are bonded in the groove of the unsulfonated half of the cover with the epoxy resin formulation of example 1.

After curing the assembly for 6 hours at room temperature, the assembly is clamped in an Instron testing machine, the strips are pulled and the force in pounds is recorded as a function of time. The strips bonded to the unsulfonated half of the cover failed in the range from 6–8 pounds. The strips bonded to the sulfonated half failed at 165 pounds while one strip broke into two pieces at 90 pounds (no failure of the bond). This test thus shows the bonding of the cover was increased at least 20 times by the sulfonation treatment and thus simulates an actual testing of the sealed battery under a rough handling test.

Improved results similar to the foregoing are obtained using a nongrooved cover.

EXAMPLE 3

In a manner similar to example 2, a cover and test strips of high density polyethylene are sulfonated and sealed with epoxy resins to achieve greatly increased bonding of the strips to the cover.

EXAMPLE 4

Six molded polyethylene cylindrical containers 3 inches in diameter by 4 inches long having molded external screw threads on one end and mating molded polyethylene caps having internal threads are surface sulfonated by the method set forth in example 1.

These containers are filled with calcium chloride and the external screw threads are coated with a nonhardening epoxy formulation made from 60 parts by weight of the diglycidyl ether of bisphenol A having an epoxy equivalent weight of 186–192, 40 parts by weight of the diglycidyl ether of a mixture of polypropylene glycols having molecular weights in the range 610–670 with an epoxide equivalent weight of 305–335 and 8.9 parts by weight of diethylene triamine. The containers are then sealed by screwing on the cap.

The advantage of this flexible epoxy resin formulation is that it never hardens and thus the screw cap can be secured and replaced several times with a good seal being obtained when it is screwed in place.

A similar set of unsulfonated containers are filled with the same deliquescent chemical and sealed with the same epoxy formulation.

When both sets of these containers are stored in a humid atmosphere (90 percent relative humidity) for 24 hours, it is found that moisture will penetrate the seal of unsulfonated containers and cake the calcium chloride whereas the sulfonated, sealed containers are completely unaffected.

I claim:

1. A process for sealing a polyolefin container with its cover which comprises sulfonating the case and cover prior to sealing and effecting the seal with epoxy resin.

2. A process for sealing a polyolefin container and cover with epoxy resin which comprises sulfonating the case and cover, applying epoxy resin to the locus of the seal, assembling the cover and case, and curing the assembly for a time and temperature sufficient to develop the maximum strength of the epoxy resin.

3. The process as set forth in claim 2 wherein the case and cover are sulfonated to the extent of at least 0.005 milligram sulfonate groups per square centimeter.

4. The process as set forth in claim 2 wherein the container is a polypropylene battery case.

5. The process as set forth in claim 2 wherein the container is polyethylene.

* * * * *